United States Patent [19]

Larson

[11] Patent Number: 5,220,870

[45] Date of Patent: Jun. 22, 1993

[54] CONVERTIBLE HIGHWAY-RAILWAY HAULING VEHICLE

[76] Inventor: Ernest J. Larson, 7408 W. Shore Dr., Edina, Minn. 55435

[21] Appl. No.: 887,759

[22] Filed: May 26, 1992

[51] Int. Cl.⁵ .............................................. B61F 5/04
[52] U.S. Cl. ................................. 105/159; 105/215.2
[58] Field of Search ................ 105/72.2, 215.2, 215.1, 105/159; 410/45, 53; 280/43.23, 704, 149.2

[56] References Cited

U.S. PATENT DOCUMENTS

| 1,670,907 | 5/1928 | Skooglun | 105/49 |
| 1,814,917 | 7/1931 | Hagman | 105/159 |
| 2,965,046 | 12/1960 | Chambers | 165/215 |
| 3,207,085 | 9/1965 | Burr | 105/26 |
| 4,380,198 | 4/1983 | White, Jr. | 105/26 R |
| 4,448,132 | 5/1984 | Beatty | 105/215.2 |
| 4,497,257 | 2/1985 | White, Jr. | 105/215 C |
| 4,534,297 | 8/1985 | Johnson, Sr. | 105/215 C |
| 4,917,020 | 4/1990 | Wicks et al. | 105/4.3 |
| 4,955,292 | 9/1990 | Cripe | 105/215.2 |
| 4,961,676 | 10/1990 | Gourdin | 105/215.2 |
| 5,009,169 | 4/1991 | Viens | 105/4.1 |
| 5,016,544 | 5/1991 | Woodlam | 105/72.2 |
| 5,058,917 | 10/1991 | Richardson | 105/215.2 |

OTHER PUBLICATIONS

Railway Age—Mar. 1992—"Put Yourself on Track-"—p. 71.
Railway Gazette—Mar. 1992—"Castamasnaga"—p. 128.
Traffic Management—Sep. 1987—"Return of the Road Railer"—pp. 81–85.
Railway Gazette Int'l—Sep. 1987—"Italians join the intermodel race"—p. 605.
Holcomb, Kenneth Johnson, 1920—History, Description and Economic Analysis of Trailer—On—Flatcar (Piggyback) Transportation—Chapter III, pp. 36–72.

Primary Examiner—Mark T. Le
Attorney, Agent, or Firm—Haugen and Nikolai

[57] ABSTRACT

A hauling vehicle for both highway and railway use is disclosed. A highway wheel assembly is permanently and slidably mounted to the underside of the vehicle. The highway wheel assembly includes a set of leaf springs and air bags which are used to raise and lower the vehicle to permit coupling of a railway wheel bogie for railway use and uncoupling of the railway wheel bogie for highway use. The air bags and leaf springs also permit the highway wheel assembly to be raised off the ground when the railway wheel bogie is coupled to the hauling vehicle.

17 Claims, 2 Drawing Sheets

CONVERTIBLE HIGHWAY-RAILWAY HAULING VEHICLE

BACKGROUND OF THE INVENTION

I. Field of the Invention

The present invention relates generally to vehicles, and more particularly to bimodal hauling vehicles convertible from railway to highway use and conversely.

II. Description of the Prior Art

The idea of moving one kind of vehicle on another vehicle is not new in North America. Between 1843 and 1854, canal boats were hauled by cog railroad over mountains from one stream to another. During the 1850s and the 1860s, boats were used to haul supplies, horses and wagons of Westward bound pioneers on inland waterways. On festive occasions, Canadian railroads operated special picnic trains hauling passengers and sleighs that were mounted on flat cars. In the United States, the first railway-highway intermodal operations were termed "piggyback" operations. The early piggyback operations consisted mainly of trains hauling farmers wagons. The first piggyback train began operation in 1885 and hauled 16 wagons on eight flat cars. The distance travelled was 20 miles and the savings in time was substantial. As the service became more well known special cars were built that could haul four wagons each. Passenger service for the owners or drivers of the wagons was furnished in a separate car. The operation only lasted ten years, but it was the beginning of highway-railway intermodal travel in the United States.

The railroad faced two handicaps in competing with motor carriers. First, rail service did not offer the door-to-door pickup and delivery service provided by motor carriers, and second, freight in less than carload quantities needed better packaging for shipment by rail than by motor carrier. Piggyback service was intended to overcome these problems.

In 1926, the Chicago, North Shore and Milwaukee Railroads began hauling railroad-owned highway trailers on flat cars, providing the first modern piggyback service in the United States.

Between 1939 and 1951, the railroads' efforts to expand piggyback service were largely abandoned. The economic pressure on the railroads to increase traffic was greatly relieved by the freight shipments generated by World War II and by the pent-up demand for consumer goods immediately following the end of the war. When the backlog of orders was reduced, rail tonnage again began to decline. Before any action was taken toward increasing piggyback services, however, the Korean War increased the demand for service to such an extent that railroads did not feel it was necessary to explore avenues which might yield additional freight tonnage. When rail freight tonnage began to decline in 1952, and the railroads again became interested in methods of increasing tonnage, the search lead them to reappraisal of piggyback service. During the 1950s, piggyback operations expanded rapidly and by the end of 1959, most of the principal railroads in the United States were providing piggyback service.

Over the years, many methods and designs of piggyback service have been developed. Each, however, is a variation of one of two primary methods. One of these methods involves hauling the complete trailer and the other involves hauling only the trailer body. The Clejan System is representative of a technique for hauling the complete trailer and the New York Central Railroad's Flexi-Van Service is representative of a technique of hauling only the trailer body. The Clejan System uses trailers outfitted with special railroad wheel dollies that ride on rails built into specially fitted flatbed cars. The dollies can be either permanently attached to the trailer or detachable with a pin mechanism. Detachable dollies are put on the trailer using a hydraulic jack to lift the dolly up to the trailer bottom. A pin is used to connect the dolly to the trailer; no tools are needed. The trailer's rear roadway wheels are not detachable. Front dolly wheels are attached by positioning the wheels under the landing gear and securing them with a pin. The invention described herein does not ride on a flatbed car or have dolly wheels in the anterior portion of the trailer. Instead, it rides directly on the railroad tracks, eliminating the need for loading and unloading trailers from a flatbed car.

The New York Central Flexi-Van system uses trailers outfitted with detachable sliding rear roadway wheel assemblies. To detach a roadway wheel assembly, the trailer is backed up to a flatbed car that has a hydraulic turntable built into it. The roadway wheel assembly is released and slid forward before the turntable is hydraulically raised. The turntable mechanism lifts the trailer off of the roadway wheels. The invention described herein, does not use a detachable roadway wheel assembly. Instead, the roadway wheel assembly is slid forward to the middle of the hauling vehicle and a lifting mechanism in the roadway wheel assembly is used to lift the posterior end of the hauling vehicle for installing or removing a railroad wheel bogie. Also, the Flexi-Van system hauls the trailer on a flatbed car while the invention described herein rides directly on the railroad tracks, saving time and money in switching costs.

The search for an easier and less expensive way of carrying more tonnage lead to an innovation in intermodal transportation. In the late 1950s, the Chesapeake and Ohio Railroad developed a bimodal trailer with separate highway and railway axles, called the Rail Van. The Rail Van was designed to ride directly on the highway or the railway. In the late 1970s, a new trailer was designed with a single rail axle and tandem highway axles. This trailer, designed and built for a company called Road Railer, has a set of non-removable railway wheels located between tandem highway axles. To run on the road, the railway wheels are retracted above the highway wheels. Conversely, to run on rails, the railway wheels are extended below the roadway wheels. One major disadvantage of this system is that the railway wheels are heavy and the weight must be carried at all times. This decreases gas mileage and increases the cost of hauling tonnage over the highway. The present invention avoids this disadvantage by using a slidable highway wheel assembly and a removably attached railway wheel bogie. This allows the trailer of the present invention to drop the railway wheels when travelling over the highway, thus, reducing the cost of hauling over the highway.

The Ferrosud, Carro Bimodale System is another bimodal trailer design. It uses a two-axle railway bogie fitted with a locking device to ensure that the bogie and van trailer are correctly joined. On arrival at the road-rail transfer site, the pneumatic suspension of the trailer is used to lift the van body to a height above the rail bogie. The waiting bogie is moved under the van, the van is lowered into position, and the railway braking system is connected. The roadway wheels end up above the railroad track. One, two-axle bogie is used between two trailers with the back of one trailer mounted on one-half of the bogie and the front of another trailer mounted on the other half of the bogie. This system incorporates the advantage of removable bogies. However, in contrast to the present invention, the two-axle bogie used in the Carro Bimodale System is heavy and cannot be securely attached to the posterior end of the trailer for the purpose of lifting the bogie and moving it to a different track. The present invention uses a slidable highway wheel assembly and securely fastens the railway wheel bogie onto the posterior end of the trailer. The trailer can then be moved to various locations at the operator's desire with the bogie attached. This flexibility saves both time and money when positioning cars in the railroad yard.

U.S. Pat. No. 5,009,169, issued to Viens, discloses a rail bogie including a truck having a platform with railway wheels underneath, a fifth wheel and a hooking lock. A self-actuating lift assembly on the bogie is used to raise and hold a tractor or the back of a semi-trailer. Two different bogie designs are used to support and carry a semi-trailer on the railroad track. Neither bogie, however, can be securely attached to the trailer and lifted from the track. The invention described herein uses one type of bogie which can be attached and moved, giving it the flexibility to be moved in a railroad yard. The connecting mechanism in the present invention is also much simpler to use, since it is only a pin and hole arrangement.

U.S. Pat. No. 4,917,020, issued to Wicks, et al., discloses a transition vehicle with roadway wheels and railway wheels. The transition vehicle contains a clamping mechanism to grasp the sidewalls of a trailer being carried. The roadway wheels are raised during rail use by an air spring suspension system. The transition vehicle can be attached to a road vehicle, another rail car or a train engine. The transition vehicle, however, cannot be securely attached to the trailer and the trailer cannot lift the transition vehicle to a different track location. Again, this reduces flexibility. The transition vehicle also, unlike the invention described herein, is used on the anterior portion of the hauling vehicle, between the moving vehicle and the hauling vehicle, not on the posterior portion of the hauling vehicle.

U.S. Pat. No. 4,448,132, issued to Beatty, discloses a convertible railway highway vehicle containing railway wheels and highway wheels. The vehicle uses a number of axles for highway wheels to maximize the load it can carry. The highway wheels are on a liftable axle assembly with a locking mechanism. An airbag spring assembly is used to lift the axle assembly. Unlike the invention described herein, the railway wheels cannot be disconnected during highway use. This adds additional weight during highway use and increases the cost for hauling over the highway.

From the above analysis, it can be seen that the prior art references, individually and as a whole do not disclose a hauling vehicle convertible from highway to railway use and conversely that uses a removably attached railway wheel bogie that can be carried from one location to another and a slidable highway wheel assembly that is used to lift the posterior end of the hauling vehicle for installation and removal of the railway wheel bogie.

SUMMARY OF THE INVENTION

The present invention is directed to a hauling vehicle specifically designed for use on either the highway or the railway. The more costly, less flexible, and less efficient methods of highway or railway use, piggyback operations and bimodal travel can be disposed of.

It is accordingly, a principal object of the present invention to provide an improved hauling vehicle for carrying tonnage over both the highway and the railway.

Another object of the invention is to provide an improved method for converting a vehicle from highway to railway use and conversely, and to provide a vehicle having the flexibility to be easily relocated in the railroad yard.

Yet another object of the invention is to provide a convertible hauling vehicle that has a detachable railway bogie, reducing the weight and cost for hauling over the highway.

The foregoing features and advantages of the present invention are attained by providing a hauling vehicle convertible from highway travel to railway travel and conversely comprising a main body with an anterior end and a posterior end, a slidably connected highway wheel assembly attached to the posterior end, a socket means at said posterior end for connecting a railway wheel bogie assembly and a removably inserted railway wheel bogie assembly. The slidably attached highway wheel assembly has at least one axle and contains a lifting means for raising the posterior end of the hauling vehicle. The anterior end of the hauling vehicle has a first connecting means capable of releasably connecting the hauling vehicle to a highway moving means. The highway moving means being either a powered vehicle or another hauling vehicle. The anterior end has a second connecting means capable of releasably connecting the hauling vehicle to a railway moving means. The railway moving means being either a powered vehicle, another hauling vehicle or a train car. The posterior end of the hauling vehicle has a connecting means for releasably connecting said hauling vehicle to another hauling vehicle.

When a hauling vehicle is to be converted from highway use to railway use, the slidably attached highway wheel assembly is unlocked and the brakes on the highway wheels are applied. The main body of the hauling vehicle is slid over the highway wheel assembly, moving the highway wheel assembly to the middle of the hauling vehicle. The lifting means of the highway wheel assembly is activated and the posterior end of the hauling vehicle is raised high enough to be positioned over the main shaft of a waiting railway wheel bogie assembly. The socket at the posterior end of the hauling vehicle is positioned over the main shaft of the railway wheel bogie assembly and the lifting means is deactivated, lowering the posterior end of the hauling vehicle onto the railway wheel bogie assembly main shaft. The railway wheel bogie assembly is then attached, preferably with chains, to the posterior end of the hauling vehicle. An electro-mechanical breaking system that is part of the railway wheel bogie assembly is connected with a wiring harness permanently attached to the hauling vehicle. The lifting means of the highway wheel assembly is reactivated and the hauling vehicle with railway wheel bogies attached can be relocated to any desired track.

The hauling vehicle can be converted from railway use to highway use by using the lifting means to raise the railway wheels off the tracks and relocate the hauling vehicle. The railway wheels are lowered onto tracks in a loading area and detached from the hauling vehicle. The lifting mechanism is then activated and the trailer is pulled away from the loading area. By applying the highway wheel brakes and moving the main body of the hauling vehicle forward over the highway wheel assembly, the highway wheel assembly slides back to the posterior end. The highway wheel assembly is locked into place and the trailer is ready for road use, without the railway wheel bogie assembly attached.

Thus, the present invention reduces the cost for hauling over the highway and increases the ability of the railroad yard manager to easily move the trailer, equipped with railroad wheels, to various locations in the yard.

Other objects, features and advantages of the present invention will become apparent to those skilled in the art through the Description of the Preferred Embodiment, claims, and drawings herein wherein like numerals refer to like elements.

DESCRIPTION OF THE PREFERRED EMBODIMENT

Figure 1:
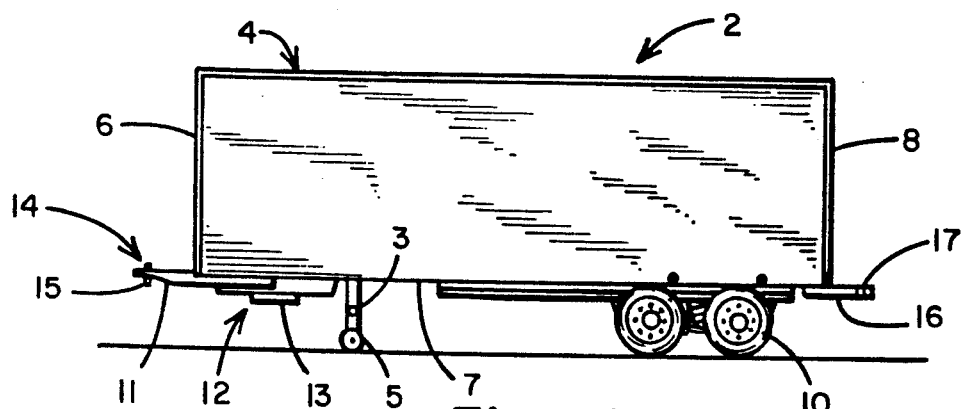
FIG. 1 is a diagrammatic side elevational view showing the convertible hauling vehicle of the present invention configured in the roadway mode of operation with the highway wheel assembly located at the posterior end.

Indicated generally in FIG. 1 is a bimodal hauling vehicle 2 convertible from highway to railway use and conversely comprising a main body 4, an anterior end 6, a posterior end 8, a bottom 7 and a highway wheel assembly 10 slidably attached to the bottom 7 at the posterior end 8.

At the anterior end 6 is a first connecting means 12 and second connecting means 14. The first connecting means 12 is preferably a fifth wheel 13 attached to the bottom 7 and used for connecting the hauling vehicle 2 to a highway moving means such as a semi-truck (not shown). The second connecting means 14 is preferably a vertical steel pin 15 on a steel hitch 11. The steel hitch 11 and pin 15 extend attachably in front of the anterior end 6 at the bottom 7 with the steel hitch 11 attached to the bottom 7. The pin 15 is made to be easily inserted into a corresponding hole 17 in a posterior end 8 steel hitch 16. The posterior end 8 steel hitch 16 is located on a locomotive or train car (not shown) or on the posterior end 8 of a hauling vehicle 2. The posterior end 8 steel hitch 16 is slidably attached to the bottom 7 at the posterior end 8 of the hauling vehicle main body 4. The hitch 16 is slid underneath the main body 4 during highway use. During railway use, the hole 17 in the steel hitch 16 is extended past the posterior end 8 for connecting to the pin 15 of a second hauling vehicle 2. This allows a train of hauling vehicles to be connected together, one after the other. The hauling vehicle 2 also has a retractable pair of dolly wheels 5 located on the bottom 7 at the anterior end 6 of the main body 4. These wheels are used for resting the hauling vehicle 2 on when not in use. The dolly wheels 5 are held in place with a pin and hole combination 3.

Figure 7:
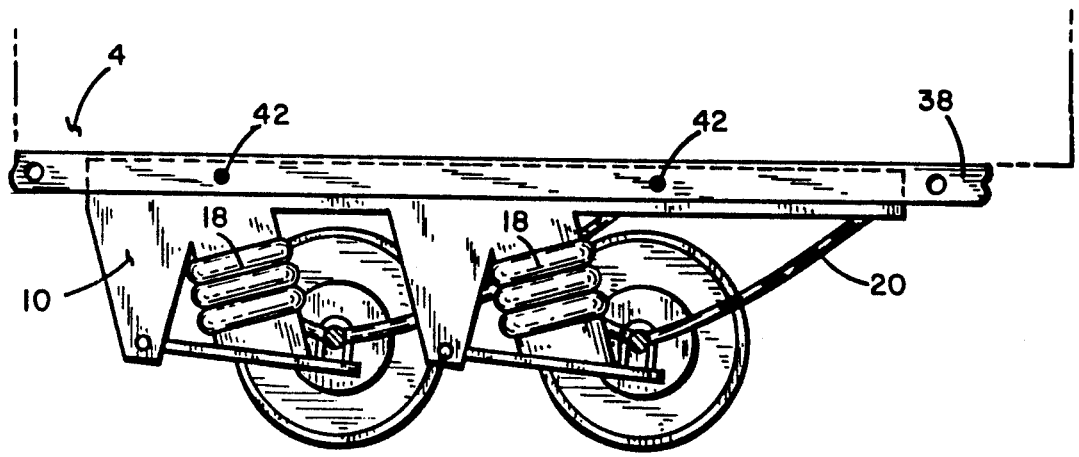
FIG. 7 is an exploded side elevational view of the convertible hauling vehicle showing the slidable highway wheel assembly, the lifting means, the retracting means, and the undercarriage rail that the highway wheel assembly slides on underneath the hauling vehicle.

As shown in FIG. 7, the slidably attached highway wheel assembly 10 has at least one axle, preferably two, a locking means 42, a lifting means 18 and a retracting means 20. The locking means 42 is a pair of pin and hole combinations located on each side of the hauling vehicle 2. The holes are in both the slidably attached highway wheel assembly 10 and an undercarriage rail 38. The undercarriage rail 38 is permanently attached to the bottom 7 of the hauling vehicle 2 and runs from the posterior end 8 longitudinally toward the anterior end 6 of the main body 4, ending in the middle of main body 4. To lock and unlock the slidable highway wheel assembly 10, pins are inserted or removed from the holes in the highway wheel assembly 10 and undercarriage rail 38 when the holes are in line with each other. When the pins are removed the highway wheel assembly 10 slides on the undercarriage rail 38, thus allowing the highway wheel assembly 10 to be repositioned beneath the main body 4 of the hauling vehicle 2. The lifting means 18 is preferably an air bag assembly and the retracting means 20 is preferably leaf springs. Both the lifting means 18 and the retracting means 20 are attached to the highway wheel assembly 10 and slide with the highway wheel assembly 10 when it is moved back and forth.

As seen in FIG. 1, the highway wheel assembly 10, equipped with conventionally used air brakes, is located generally on the bottom 7 at the posterior end 8 of the hauling vehicle 2. During highway use the highway wheel assembly 10 is locked in position at the posterior end 8 with the locking means 42. To convert the hauling vehicle 2 into a railway vehicle, the locking means 42 is unlocked, the air brakes are applied and the hauling vehicle main body 4 is slid longitudinally in the direction of the posterior end 8. This slides the highway wheel assembly 10 forward underneath the main body 4.

Figure 2:
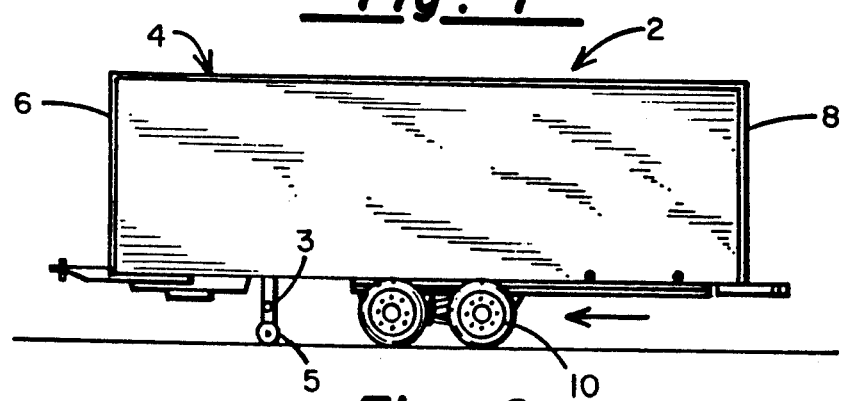
FIG. 2 is a diagrammatic side elevational view showing the convertible hauling vehicle of the present invention when the roadway wheel assembly has been slid to the middle of the hauling vehicle main body.

As seen in FIG. 2, the result of sliding the main body 4 in the direction of the posterior end 8 is the highway wheel assembly 10 being located in the middle of the main body 4. The highway wheel assembly 10 is then locked in place with the locking means 42. With the highway wheel assembly 10 locked in position, in the middle of the main body 4, the air bag assembly 18 is inflated to lift the posterior end 8 of the hauling vehicle 2.

Figure 3:
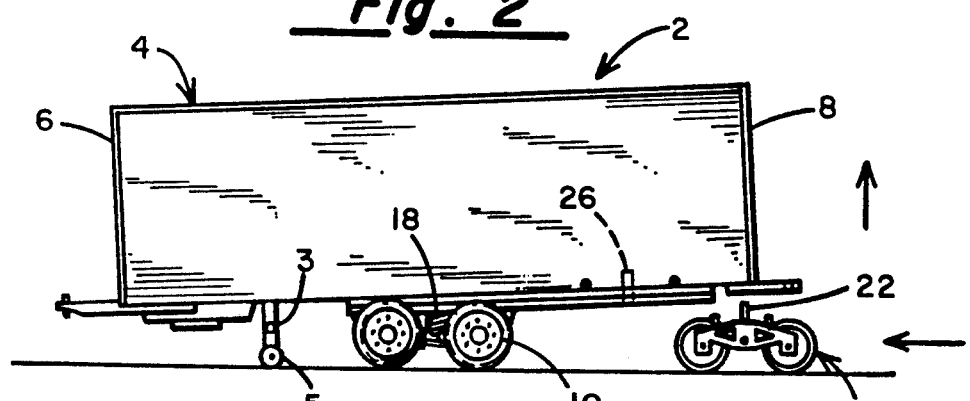
FIG. 3 is a diagrammatic side elevational view showing the convertible hauling vehicle of the present invention when the lifting means in the highway wheel assembly is inflated and the railway wheel bogie is being slid underneath the posterior end of the hauling vehicle.
Figure 5:
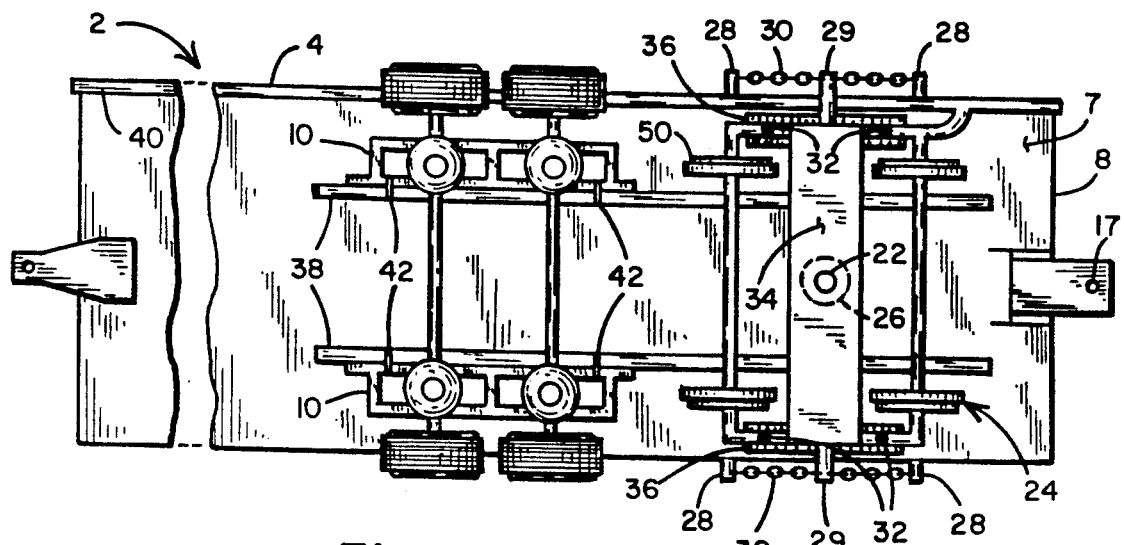
FIG. 5 is a bottom view of the convertible hauling vehicle configured in the railway mode of operation with the highway wheel assembly positioned in the middle of the hauling vehicle and the railway wheel bogie securely attached to the posterior end of the hauling vehicle.

As seen in FIGS. 3 and 5, a socket 26 is located underneath the main body 4 at the posterior end 8. The posterior end 8 is raised above a main shaft 22 of a railway wheel bogie 24. The railway wheel bogie 24 is moved underneath the posterior end 8 of the main body 4. The main shaft 22 of the railway wheel bogie 24 is positioned below the socket 26 and the air bag assembly 18 is deflated until the main body 4 comes to rest on the railway bogie 24. This lowers the socket 26 of the posterior end 8 over the main shaft 22 of the railway wheel assembly 24, removably inserting said shaft 22 into the socket 26.

Figure 4:
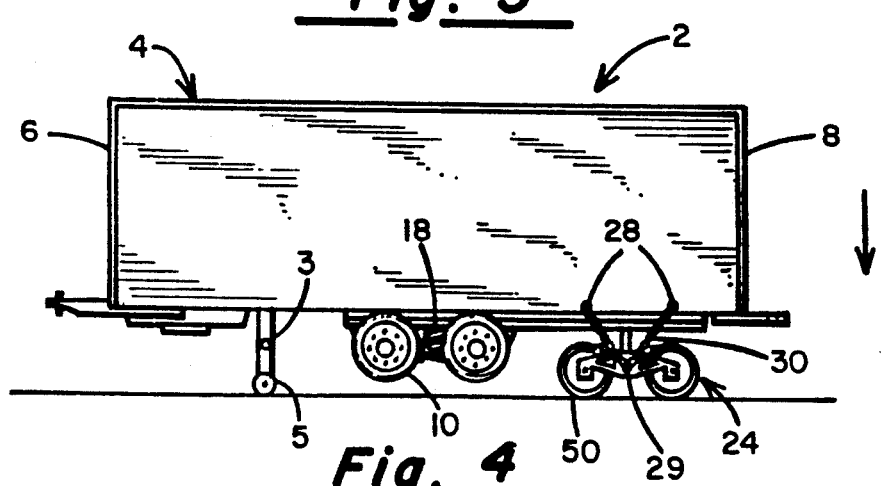
FIG. 4 is a diagrammatic side elevational view showing the convertible hauling vehicle of the present invention configured in the railway mode of operation with the highway wheel assembly retracted and the railway wheel bogie securely attached to the hauling vehicle.
Figure 6:
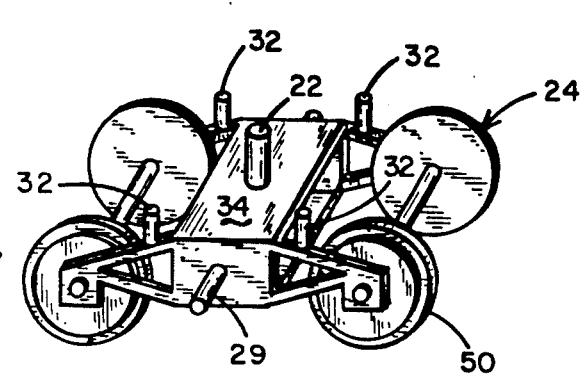
FIG. 6 is a side elevational view of the railway wheel bogie used in the present invention.

As shown in FIGS. 4, 5 and 6 the railway wheel bogie 24, with a conventional electro-mechanical braking system, comprises a main shaft 22, a frame 34, wheels 50, sway reducing bars 32 and permanently attached pins 29. The main shaft 22 removably fits into the socket 26 located at the posterior end 8 of the hauling vehicle 2. The railway wheel bogie 24 is securely attached to the main body 4 using the pins 29 permanently attached to the railway bogie 24, pins 28 permanently attached to the main body 4 and chains 30. Two pins 28 are permanently attached to each side of the main body 4 and one pin 29 is permanently attached to each side of the railway wheel bogie 24. A chain 30 is secured on each side of the hauling vehicle 2 to the pins 28 and 29, one chain 30 for each side. This securely fastens the railway wheel bogie 24 to the hauling vehicle 2. Inflating the air bags 18 allows the hauling vehicle 2, with railway wheel bogie 24 attached, to be relocated to an identified track. The sway reducing bars 32 on the railway wheel bogie 24 hit against the sway reducing pads 36 permanently attached to the bottom 7 of the hauling vehicle 2. This reduces the sway of the hauling vehicle 2 when used for railway travel. Two sway reducing bars 32 and one sway reducing pad 36 are located on each side of the hauling vehicle 2. The sway reducing pads 36 are located on the outside of the undercarriage rail 38. The bogie's electro-mechanical brakes are connected to a wiring harness 40 that runs the length of the hauling vehicle 2, connecting one hauling vehicle 2 to another and ultimately connecting to a moving or control vehicle (not shown).

As shown in FIG. 4, when the railway wheel bogie 24 has been positioned on the desired track, the air bag lifting means 18 is fully deflated and the highway wheel assembly 10 retracts to a position above the bottom of the railway wheels 50. FIG. 7 shows the retracting means 20 is a set of leaf springs attached to the highway wheel assembly 10. The leaf springs 20 pull the highway wheel assembly 10 up to the main body 4 and out of the way for railway travel.

To convert the hauling vehicle 2 from railway travel to highway travel, the airbag assembly 18 is inflated and the vehicle 2 is moved to a track identified for unloading the railway wheel bogie 24. The railway wheel bogie 24 is positioned over the track and the airbag 18 is deflated until the bogie 24 rests on the track and the chains 30 connecting the main body 4 and railway bogie 24 loosen. The chains 30 are removed from the pins 28 and 29 and the air bag 18 is inflated. This raises the posterior end 8 of the hauling vehicle 2 above the bogie 24, so the main shaft 22 slides out of the socket 26 located at the posterior end 8 of the hauling vehicle 2. The hauling vehicle 2 is moved away from the bogie 24 and the air bag 18 is deflated to a level used for highway use. The locking means 42 holding the highway wheel assembly 10 is unlocked and the main body 4 is moved forward for highway use. This moves the highway wheel assembly 10 to the posterior end 8. The highway wheel assembly 10 is locked into place with the locking means 42 and the air brakes are released for highway travel.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A hauling vehicle convertible between highway and railway use comprising:
   (a) a main body having an anterior portion, a posterior portion and a middle portion therebetween, the main body having a bottom and an undercarriage rail attached to the bottom, the undercarriage rail extending longitudinally from the posterior portion to the middle portion;
   (b) a highway wheel assembly mounted to the undercarriage rail and longitudinally slidable between a first and a second position, the highway wheel assembly having a top portion, at least one highway wheel axle with attached highway wheels, a retracting means attached to the top portion and to the highway wheel axle for urging the highway wheel axle toward the bottom of the main body, lifting means attached to the top portion and to the highway wheel axle for lifting the main body away from the highway wheel axle, means for releasably locking the highway wheel assembly longitudinally along the undercarriage rail in the first and second positions, and brake means for slowing and stopping the highway wheels;
   (c) a socket in the bottom of the posterior portion of the main body;
   (d) a railway wheel bogie having a frame, a vertical main shaft projecting upwardly from the frame, at least one railway wheel axle mounted to the frame and railway wheels mounted to the railway wheel axle, the railway wheel axle being perpendicular to the vertical main shaft and parallel to the main body when the vertical main shaft is inserted into the socket;
   (e) a pin permanently attached to the main body;
   (f) a pin permanently attached to the railway wheel bogie;
   (g) a chain removably attached to the pin on the main body and the pin on the railway wheel bogie for fastening the railway wheel bogie to the main body; and
   (h) connecting means at the anterior and posterior portions of the main body for connecting the hauling vehicle to another vehicle.

2. The hauling vehicle of claim 1 wherein the retracting means is a set of leaf springs.

3. The hauling vehicle of claim 1 wherein the lifting means includes at least one air bag.

4. The hauling vehicle of claim 1 wherein the brake means for the highway wheel assembly is air brakes.

5. The hauling vehicle of claim 1 wherein the railway wheel bogie includes electromechanical brakes removably connected to a wiring harness, the wiring harness being attached to the hauling vehicle.

6. The hauling vehicle of claim 1 wherein the railway wheel bogie and the main body further have sway reducer means for reducing the sway of the main body on the railway wheel bogie.

7. The hauling vehicle of claim 1 further comprising retractable dolly wheels attached to the bottom of the anterior portion.

8. Converting the hauling vehicle of claim 1 from highway to railway use in a method comprising the steps of:
 (a) applying the brake means of the highway wheel assembly;
 (b) unlocking the means for releasably locking the highway wheel assembly longitudinally along the undercarriage rail;
 (c) sliding the main body backward over the highway wheel assembly and positioning the highway wheel assembly beneath the middle portion of the main body;
 (d) locking the means for releasably locking the highway wheel assembly longitudinally along the undercarriage rail;
 (e) activating the lifting means to raise the posterior portion of the main body;
 (f) releasing the brake means of the highway wheel assembly;
 (g) positioning the socket over the vertical main shaft of the railway wheel bogie;
 (h) deactivating the lifting means to lower the socket onto the vertical main shaft; and
 (i) attaching the chain to the pin on the main body and the pin on the railway wheel bogie to fasten the railway wheel bogie to the main body.

9. Converting the hauling vehicle of claim 1 from railway to highway use in a method comprising the steps of:
 (a) removing the chain from the pin on the main body and the pin on the railway wheel bogie to unfasten the railway wheel bogie from the main body;
 (b) activating the lifting means to raise the socket and the posterior portion of the main body above the vertical main shaft;
 (c) moving the hauling vehicle away from the railway wheel bogie;
 (d) deactivating the lifting means to lower the main body;
 (e) applying the brake means of the highway wheel assembly;
 (f) unlocking the means for releasably locking the highway wheel assembly longitudinally along the undercarriage rail;
 (g) sliding the main body forward over the highway wheel assembly and positioning the highway wheel assembly beneath the posterior portion of the hauling vehicle; and
 (h) locking the means for releasably locking the highway wheel assembly longitudinally along the undercarriage rail.

10. A hauling vehicle convertible between highway and railway use comprising:
 (a) a main body having an anterior portion, a posterior portion and a middle portion therebetween, the main body having a bottom and an undercarriage rail attached to the bottom and extending longitudinally from the posterior portion to the middle portion;
 (b) a highway wheel assembly mounted to the undercarriage rail and longitudinally slidable between a first and a second position, the highway wheel assembly having a top portion, at least one highway wheel axle with attached highway wheels, a set of leaf springs attached to the top portion and to the highway wheel axle for urging the highway wheel axle toward the bottom of the main body, lifting means attached to the top portion and to the highway wheel axle for lifting the main body away from the highway wheel axle by overcoming the set of leaf springs, means for releasably locking the highway wheel assembly longitudinally along the undercarriage rail in the first and the second positions, and brake means for slowing and stopping the highway wheels;
 (c) a socket in the bottom of the posterior portion of the main body;
 (d) a railway wheel bogie having a frame, a vertical main shaft projecting upwardly from the frame, at least one railway wheel axle mounted to the frame, and railway wheels mounted to the railway wheel axle, the railway wheel axle being perpendicular to the vertical main shaft and parallel to the main body when the vertical main shaft is inserted into the socket; and
 (e) connecting means at the anterior and posterior portions for connecting the hauling vehicle to another vehicle.

11. The hauling vehicle of claim 10 wherein the lifting means includes at least one air bag.

12. The hauling vehicle of claim 10 wherein the brake means for the highway wheel assembly is air brakes.

13. The hauling vehicle of claim 10 wherein the railway wheel bogie further includes electromechanical brakes removably connected to a wiring harness, the wiring harness attached to the hauling vehicle.

14. The hauling vehicle of claim 10 wherein the railway wheel bogie and the main body further have sway reducer means for reducing the sway of the main body on the railway wheel bogie.

15. The hauling vehicle of claim 10 further comprising retractable dolly wheels attached to the bottom of the anterior portion.

16. Converting the hauling vehicle of claim 10 from highway to railway use in a method comprising the steps of:
 (a) applying the brake means of the highway wheel assembly;
 (b) unlocking the means for releasably locking the highway wheel assembly longitudinally along the undercarriage rail;
 (c) sliding the main body backward over the highway wheel assembly and positioning the highway wheel assembly beneath the middle portion of the main body;
 (d) locking the means for releasably locking the highway wheel assembly longitudinally along the undercarriage rail;
 (e) activating the lifting means to raise the posterior portion of the main body;
 (f) releasing the brake means of the highway wheel assembly;

(g) positioning the socket over the vertical main shaft of the railway wheel bogie; and (h) deactivating the lifting means to lower the socket onto the vertical main shaft.

17. Converting the hauling vehicle of claim 10 from railway to highway use in a method comprising the steps of:

(a) activating the lifting means to raise the socket and the posterior portion of the main body above the vertical main shaft;

(b) moving the hauling vehicle away from the railway wheel bogie;

(c) deactivating the lifting means to lower the main body;

(d) applying the brake means of the highway wheel assembly;

(e) unlocking the means for releasably locking the highway wheel assembly longitudinally along the undercarriage rail;

(f) sliding the main body forward over the highway wheel assembly and positioning the highway wheel assembly beneath the posterior portion of the hauling vehicle; and (g) locking the means for releasably locking the highway wheel assembly longitudinally along the undercarriage rail.

* * * * *